United States Patent [19]

Stancil

[11] Patent Number: 4,796,983
[45] Date of Patent: Jan. 10, 1989

[54] OPTICAL FREQUENCY SHIFTER USING MAGNETOSTATIC WAVES

[76] Inventor: Daniel D. Stancil, 855 MacArthur Dr., Pittsburgh, Pa. 15228

[21] Appl. No.: 58,586

[22] Filed: Jun. 5, 1987

[51] Int. Cl.[4] .............................................. G02F 1/09
[52] U.S. Cl. ................................... 350/376; 350/321
[58] Field of Search ............... 350/358, 162.12, 355, 350/374, 376, 321

[56] References Cited

U.S. PATENT DOCUMENTS 4,575,179 3/1986 Lee et al. ...................... 350/162.12
4,588,296 3/1986 Cahill et al. ........................ 350/358
4,687,958 8/1987 Sommargren ...................... 350/358

Primary Examiner—Bruce Y. Arnold
Attorney, Agent, or Firm—Reed Smith Shaw & McClay

[57] ABSTRACT

An optical frequency shifter that uses mode coupling of magnetostatic waves with light having frequency $\omega_o$ from a laser. A controllable external magnetic biasing field and a controlled microwave source are used to independently specify the frequency $\omega_q$ and wavenumber $K_q$ of the magnetostatic wave. As a result, the mode coupling can be maintained over a range of frequencies $\omega_q$ so a shifted beam of light $\omega_o \pm \omega_q$ can be produced.

9 Claims, 3 Drawing Sheets

OPTICAL FREQUENCY SHIFTER USING MAGNETOSTATIC WAVES

FIELD OF THE INVENTION

The present invention relates to a frequency shifter for light. More specifically, the present invention relates to a frequency shifter for light utilizing mode coupling of magnetostatic waves and light.

BACKGROUND OF THE INVENTION

Lasers produce light having a distinct frequency. The frequency of the light is directly related to the type of material the laser is made of and the corresponding energy that is released when electrons of the material fall to a more stable level from a less stable or more excited state. Since existing material may only lase at a limited number of frequencies, there is a need to be able to shift the produced light to a more desired frequency for various applications.

Recently, the use of magnetostatic waves to mode couple with light in a thin film has been demonstrated. See, U.S. Pat. No. 4,575,179 to Lee, et al. Therein there is taught the use of magnetostatic waves to diffract the light in proportion to the magnetostatic wave. The amount the light is diffracted can be determined and thus the signal producing the magnetostatic waves can be identified. However, Lee, et al. does not teach or disclose a way that magnetostatic waves can be used to shift light to a desired frequency over a broad range.

SUMMARY OF THE INVENTION

Accordingly, one object of the present invention is to provide for a tunable laser.

Another object of the present invention is to provide a frequency shift of ±40-60 GHz to a laser.

Another object of the present invention is to provide a predetermined external magnetic biasing field around a sample wherein mode coupling of magnetostatic waves and light occurs with a resulting desired frequency shift to the light.

These and other objects of the present invention are achieved with a frequency shifter comprising: means for producing a monochromatic beam of light having frequency $\omega_o$; means for producing magnetostatic waves having frequency $\omega_q$ and wavenumber $K_q$; means for varying the magnetostatic wave frequency $\omega_q$ while maintaining the magnetostatic wave number $K_q$; and means for allowing the magnetostatic waves and the beam of light to mode couple so light having frequency $\omega_o \pm \omega_q$ is produced.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
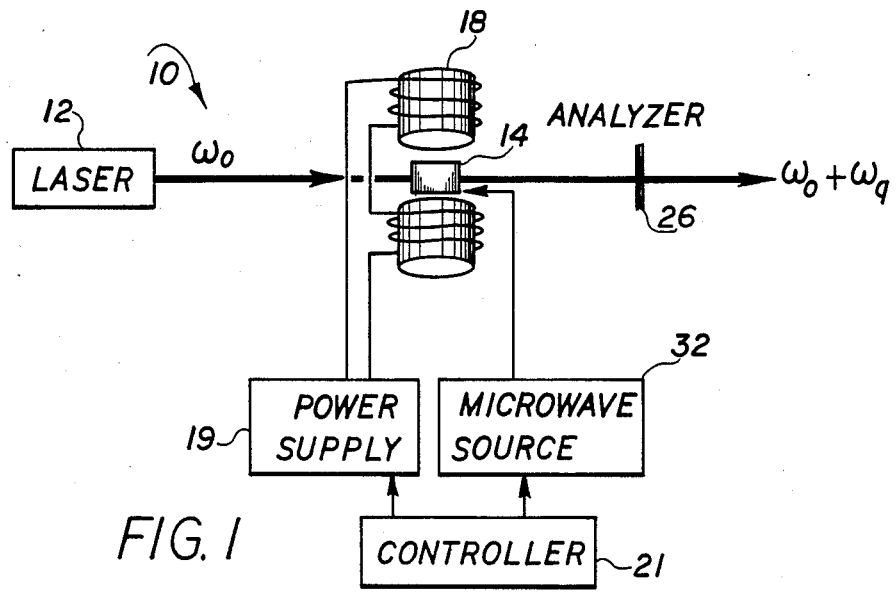
FIG. 1 is a schematic diagram of the frequency shifter.

Referring now to the drawings, wherein like reference numerals designate identical or corresponding parts throughout the several views, and more particularly to FIG. 1 thereof there is shown a frequency shifter 10. The frequency shifter 10 is comprised of a laser 12 that produces a monochromatic beam of light with frequency $\omega_o$. The beam of light is introduced into a sample 14 that allows light to propagate through it. A transducer 16 on the sample 14 introduces magnetostatic waves having frequency $\omega_q$ into the waveguide to interact with the beam of light. The magnetostatic waves are excited by a microwave source 32 that is preferably connected to a controller 21 which enables the magnetostatic wavenumber $K_q$ to be varied. There is means for varying the magnetostatic wavefrequency $\omega_q$ while maintaining the magnetostatic wavenumber $K_q$, such as the controller 21 and a magnetic field source 18 connected thereto. The sample 14 is immersed in a magnetic field produced by a magnetic field source 18. The strength of the magnetic field along with the frequency of the microwave source 32 is determined by a controller 21 and designates the frequency shift of the light beam that leaves the sample 14.

Figure 2:
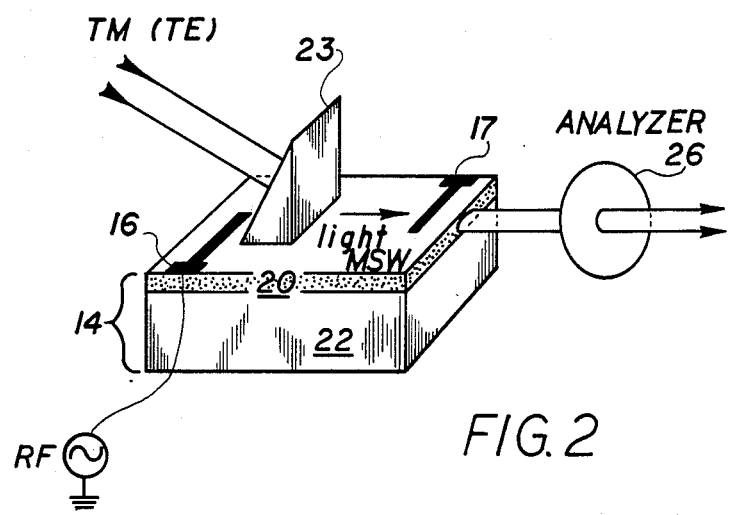
FIG. 2 is a side view of the sample.

More specifically, a light source 12 produces a polarized monochromatic beam of light with frequency $\omega_o$. (The interaction between the light and the magnetostatic waves will occur even if the light is not polarized, but unpolarized unshifted light would be difficult to separate from the desired output). The light source 12 can be a laser, L.E.D., or any source that produces a beam of light that has a distinct enough frequency $\omega_o$ which allows a frequency shift of $\pm\omega_q$ to be of effective value. In other words, the frequency of the incident light cannot be distributed over such a range that a frequency shift will be lost by shifting into a frequency that already exists in the beam. The beam of light is injected by well known methods into a sample 14, for instance through an entry port 23, or through the side of the sample 14. If light is introduced through the port 23, then a very exact propagating mode can be isolated. If the light is introduced through the side of the film, then all modes below the cutoff frequency of the sample will propagate. Regardless of how light is introduced into the sample, as is discussed below, only the light modes that are able to undergo mode conversion provide shifted light. The sample 14, see FIG. 2, is such that it allows the light beam, as well as a magnetostatic wave, to propagate therethrough and interact. The sample 14 can be for instance made of a thin film 20 on a substrate 22. The film 20 should have the properties that it have low optical absorption, it have a high Faraday rotation, and it have low microwave loss. The substrate 22 should have the properties that it is non-magnetic and it has a lower index of refraction than the film 20. The material above the film 20, whether it be air or another substrate layer, must also have a lower index of refraction than the film 20 so the film 20 is a waveguide. The film 20 may, for example, be a thin magnetic garnet film such as Bismuth substituted yttrium iron garnet (YIG). The substrate 22 may for instance be gadolinium gallium garnet (GGG).

Figure 3:
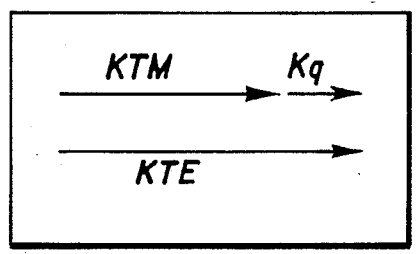
FIG. 3 is a vector representation of the relationship $K_{TE} = K_{TM} + K_q$.

A transducer 16 on the film 20 introduces magnetostatic waves into the film 20 at a steady rate in a direction parallel to the propagating light. A full discussion of the interaction of the magnetostatic waves with light waves in the sample 14 can be found in "Optical Signal Processing With Magnetostatic Waves" by A. D. Fisher in Circuits, Systems Signal Process Vol. 4, No. 1-2, 1985. What is important to realize for efficient mode conversion between the optical TE and TM modes is that the wavenumber of the magnetostatic wave must equal the difference between the optical TM and TE mode wavenumbers. Then the magneto-optical coupling in the film causes energy from, for instance, the incident TM mode to couple into the TE mode. See FIG. 3 where $K_q + K_{TM} = K_{TE}$. This new TE mode which exits the sample has a frequency $\omega_o + \omega_q$ and can be separated from the unconverted TM mode with a polarization analyzer 26. If the entire TM mode couples into the TE mode then there, of course, is no TM Mode left to be separated from the TE mode.

Figure 4:
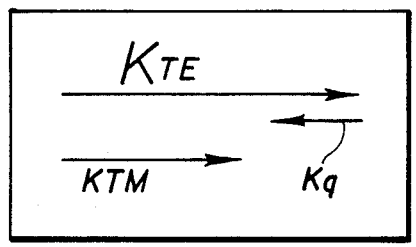
FIG. 4 is a vector representation of the relationship $K_{TM} = K_{TE} - K_q$.

Similarly, if the direction of propagation of the magnetostatic wave is reversed, and the incident optical polarization selected is the TE Mode instead of the TM mode, the converted (or diffracted) TM Mode will have frequency $\omega_o - \omega_q$. See FIG. 4 where $K_{TM} = K_{TE} - K_q$. The direction of propagation of the mag wave can be reversed simply by placing a transducer 17 at the opposite side of the film 20. It is also a simple matter to have both transducers 16, 17 in place on a sample 14 to provide for the desired coupling in the same sample 14 with some form of a switch controlling which transducer the magnetostatic waves arises. Thus the sample 14 with the transducers 16, 17 are capable of shifting the frequency by $\pm \omega_q$. Since magnetostatic waves can be excited at frequencies as high as 20–30 GHz, the tunable range of the light beam can be as high as 40–60 GHz.

Figure 5:
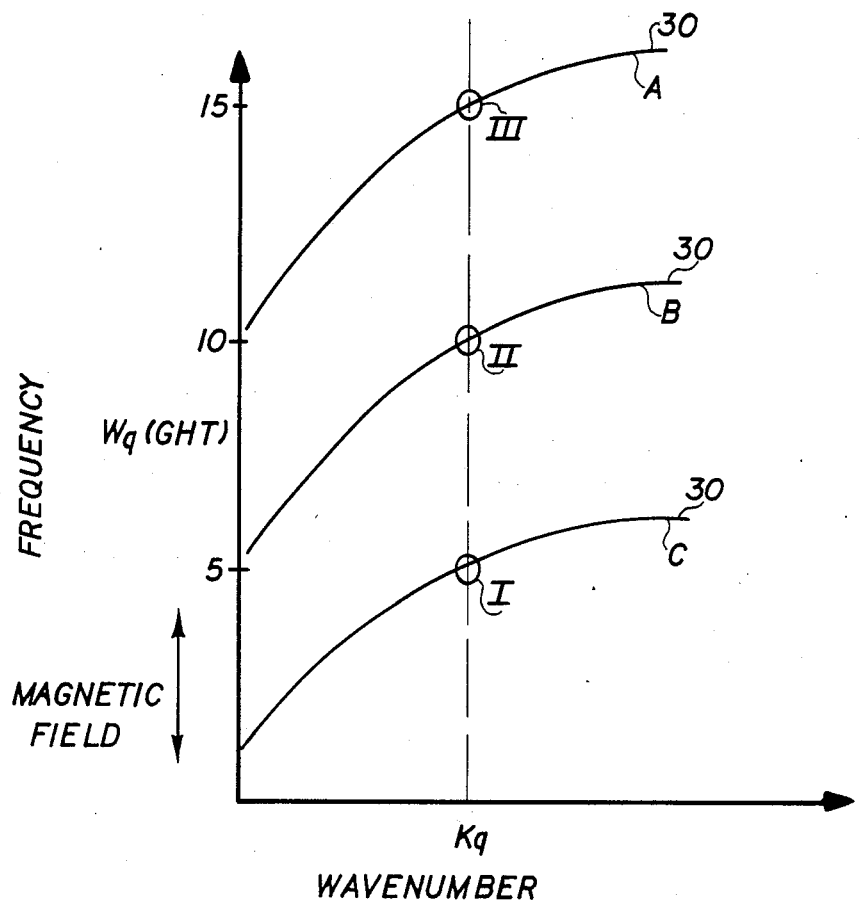
FIG. 5 is a graph depicting $\omega_q$ versus $K_q$ for various external magnetic biasing fields.

To maintain efficient mode conversion, the phase matching condition $|K_q| = K_{TE} - K_{TM}$ must be maintained. By realizing that the wavenumber $K_q$ depends on the strength of an externally-applied magnetic bias field as well as the frequency $\omega_q$, the wave number $K_q$ can be held constant by varying the bias field as the frequency $\omega_q$ is varied. Thus, incredibly, the phase matching condition $|Kq| = K_{TE} - K_{TM}$ can be maintained so interaction of the magnetostatic wave having frequency $\omega_q$ and the light beam having $\omega_o$ can be maintained with the frequency wq being chosen as desired. Then a light beam $\omega_o \pm \omega_q$, depending on whether the TE or TM mode is being coupled, is produced where $\omega_q$ can be varied. This may better be understood by referring to FIG. 5 which is a graph depicting several functions 30 of the magnetostatic frequency $\omega_q$ versus the magnetostatic wavenumber $K_q$. There are shown, for illustration purposes, three different functions 30 designated as lines A, B and C. Each function 30 corresponds to a different external magnetic biasing field that is immersing the sample 14. The biasing field is produced by the magnetic source 18. The source 18 can be, for example, magnetic material wrapped in a current carrying coil which is located on each side of the sample 14. A power supply 19 controlled by the controller 21 determines how much current passes through the coil and hence the strength of the magnetic biasing field. Note how for a different magnetic biasing field a different frequency $\omega_q$ can be obtained for a given wavenumber $K_q$. The details of the function 30 are in general determined by the geometry of the sample. (See R. W. Damon and J. R. Eshbach, "Magnetostatic Modes of a Ferromagnet Slab", *J. Phys. Chem. Solids*, Vol. 19, p. 308 (1961); R. W. Damon and H. Van de Vaart, "Propagation of Magnetostatic Spin Waves at Microwave Frequencies in Normally-Magnetized Disk", *J. Appl. Phys.*, Vol. 36, p. 3453 (1965); and M. S. Sodha and N. C. Srivastava, *Microwave Propagation in Ferrimagnetics,* Plenum Press, (1981) for a more detailed discussion and examples of such functions). The wavenumber $K_q$ that allows mode coupling to occur is determined by the geometry of the sample and the wavelength of the incident light. See A. D. Fisher, supra. For purposes of illustration in FIG. 5, the vertical dashed line corresponds to a wavenumber $K_q$ that has to exist relative to a given geometry and incident light beam frequency for mode coupling to occur. If, for instance, an incident light beam is desired to be shifted 5 GHz, then the microwave source 32 is set to this frequency. Next, the specific wavenumber $K_q$ that produces mode coupling must be achieved. This is accomplished by choosing the external magnetic biasing field that is associated with function 30, line C. In general, by varying the microwave frequency that produces the magnetostatic waves, the location on a line A, B, C of $K_q$ is changed. By varying the external magnetic biasing field, the position of the entire line is shifted. A controller 21 coordinates the magnetic field produced by the magnetic field source 18 and the microwave frequency from the microwave source 32 to obtain the desired $\omega_q$ for the required $K_q$. If, for instance, a frequency shift of 10 or 15 GHz is desired, then the microwave source is set to the appropriate frequency and external biasing fields corresponding to lines B and A, respectively, are chosen. It should be noted that FIG. 5 is purely for illustrative purposes and the functions 30 and lines A, B, and C do not necessarily correspond to actual geometries of the sample 14.

Obviously, numerous (additional) modifications and variations of the present invention are possible in light of the above teachings. It is therefore to be understood that within the scope of the appended claims, the invention may be practiced otherwise than as specifically described herein.

I claim:

1. A frequency shifter comprising:
   means for producing a monochromatic beam of light having frequency $\omega_o$;
   means for producing magnetostatic waves having frequency $\omega_q$ and wavenumber $K_q$;
   means for varying the magnetostatic wave frequency $\omega_q$ while maintaining the magnetostatic wave number $K_q$; and
   means for allowing the magnetostatic waves and the beam of light to interact so light having frequency $\omega_o + \omega_q$ is produced.

2. A frequency shifter comprising:
   means for producing a monochromatic beam of light having frequency $\omega_o$;
   means for producing magnetostatic waves having frequency $\omega_q$ and wavenumber $K_q$;
   means for varying the magnetostatic wave frequency $\omega_q$ while maintaining the magnetostatic wave number $K_q$; and
   means for allowing the magnetostatic waves and the beam of light to interact so light having frequency $\omega_o - \omega_q$ is produced.

3. A frequency shifter as described in claim 1 or 2 including means for varying the magnetostatic wavenumber $K_q$.

4. A frequency shifter as described in claim 3 wherein the monochromatic beam of light is polarized.

5. A frequency shifter as described in claim 4 wherein the means for varying the magnetostatic wave frequency $\omega_q$ while maintaining the magnetostatic wavenumber $K_q$ includes means for producing a magnetic field, said magnetic field immersing the allowing means such that mode coupling occurs between the light and the magnetostatic waves.

6. A frequency shifter as described in claim 5 wherein the means for varying the magnetostatic wavenumber $K_q$ and the means for varying the magnetostatic wave frequency $\omega q$ includes a controller connected to the means for producing magnetostatic waves and to the magnetic field producing means, respectively.

7. A frequency shifter as described in claim 6 wherein the means for producing magnetostatic waves is at least one transducer located on the allowing means; and a microwave source connected thereto, said microwave source also connected to the controller.

8. A frequency shifter as described in claim 6 wherein the allowing means is a sample having a film of low microwave loss, low optical absorption and high faraday rotation situated on a substrate that is non-magnetic and uses a lower index of refraction than the film, said sample situated so that the beam of light propagates through the film, and wherein the means for producing magnetostatic waves is a first and second transducer located on the film and producing magnetostatic waves propagating in a direct parallel and antiparallel, respectively, to the propagating light; and a microwave source connected to the first and second transducers.

9. A frequency shifter as described in claim 8 wherein the film is YIG and the substrated is GGG.

* * * * *